(12) United States Patent
Reilly

(10) Patent No.: US 7,363,035 B2
(45) Date of Patent: Apr. 22, 2008

(54) METHOD AND APPARATUS FOR PROVIDING CONTENT TO A MOBILE TERMINAL

(75) Inventor: Paul Jefferson Reilly, Cambridge (GB)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 10/503,793

(22) PCT Filed: Feb. 7, 2003

(86) PCT No.: PCT/GB03/00564

§ 371 (c)(1),
(2), (4) Date: Aug. 12, 2005

(87) PCT Pub. No.: WO03/067465

PCT Pub. Date: Aug. 14, 2003

(65) Prior Publication Data

US 2006/0014523 A1  Jan. 19, 2006

(30) Foreign Application Priority Data

Feb. 7, 2002 (GB) .................... 0202865.2
Mar. 22, 2002 (GB) .................... 0206802.1
Nov. 28, 2002 (GB) .................... 0227751.5

(51) Int. Cl.
*H04Q 7/20* (2006.01)

(52) U.S. Cl. .............. 455/432.3; 455/312.1; 455/414.1; 370/395.43; 340/7.48

(58) Field of Classification Search .......... 455/432.3, 455/412.1, 414.1, 414.2, 425, 557, 312.1; 370/395.43; 340/7.48

See application file for complete search history.

(56) References Cited

U.S. PATENT DOCUMENTS

| 5,701,580 A | * | 12/1997 | Yamane et al. ............. 455/3.01 |
| 6,163,779 A | | 12/2000 | Mantha et al. ............. 707/100 |
| 6,404,754 B1 | * | 6/2002 | Lim .......................... 370/338 |
| 6,405,060 B1 | * | 6/2002 | Schroeder et al. .......... 455/566 |
| 6,608,556 B2 | * | 8/2003 | De Moerloose et al. .... 340/501 |
| 6,701,154 B2 | * | 3/2004 | Ito ........................... 455/456.1 |
| 6,804,537 B1 | * | 10/2004 | Fujii ......................... 455/557 |
| 6,876,661 B2 | * | 4/2005 | Asai .......................... 370/401 |

(Continued)

FOREIGN PATENT DOCUMENTS

GB  2366877  3/2002 .................... 17/30

(Continued)

OTHER PUBLICATIONS

British Patent Office Search Report; Apr. 24, 2003.

(Continued)

*Primary Examiner*—Nghi H. Ly
(74) *Attorney, Agent, or Firm*—Robert J. O'Connell; Nicholas A. Cole; Thomas Rouse (57) ABSTRACT

A method and apparatus of providing content to a mobile terminal includes receiving data at the mobile terminal, classifying the content data in accordance with classification data included within the content data, storing the content data within the mobile terminal, creating an access object whereby the content data may be accessed, find associating the access object with further access objects having similar classification codes. This has a significant effect in simplifying the provision of content to mobile terminals.

29 Claims, 4 Drawing Sheets

U.S. PATENT DOCUMENTS

| | | | |
|---|---|---|---|
| 6,879,842 B2 * | 4/2005 | King et al. | 455/550.1 |
| 2002/0054087 A1 * | 5/2002 | Noll et al. | 345/744 |
| 2002/0156832 A1 | 10/2002 | Duri et al. | 709/203 |

FOREIGN PATENT DOCUMENTS

| | | | | |
|---|---|---|---|---|
| GB | 2367661 | 4/2002 | | 17/30 |
| GB | 2379289 | 3/2003 | | 17/30 |
| WO | WO 0055741 | 2/2000 | | 13/14 |
| WO | WO 0103403 | 1/2001 | | 29/6 |
| WO | WO 0186503 | 11/2001 | | 17/30 |
| WO | WO 0193485 | 12/2001 | | |

OTHER PUBLICATIONS

International Search Report for PCT /GB03/00564; May 22, 2003.

Keller R M et al.: A bookmarking service for organizing and sharing URLs; Sep. 1, 1997.

* cited by examiner

METHOD AND APPARATUS FOR PROVIDING CONTENT TO A MOBILE TERMINAL

This invention relates to the field of providing content to a mobile terminal and in particular to classifying and storing content data within a mobile terminal.

It is already possible to use a mobile handset for browsing remote content using wireless technology for the communications link. This content might be from the Internet, or may be specifically created for mobile telephone handsets, using, for example the Wireless Application Protocol, (WAP). The user typically initiates such a session by starting the browser in his terminal, and either entering an address for the content he wishes to access, or more conveniently, selecting a bookmark which provides a shortcut to the address, the bookmark having been entered and stored previously. The address may conveniently follow the well-established URL (Uniform Resource Locator) format.

Such browsing behaviour is distinct from the other mode of usage of the handset, namely local or non-connected use, such as managing the local address book content, or playing a local game. There are a number of drawbacks for the user in this means of accessing remote content in terms of usability, which include, amongst other factors, entering a URL is quite laborious and error-prone, especially on a small mobile handset which typically does not have a full-size QWERTY layout keyboard; where bookmarks are used, they risk becoming out of date and they are also difficult to manage within a small screen user interface, requiring the user to create categories (if such a feature exists on the handset) and remember their meaning; and there is no effective non-intrusive means for the owner of remote content to present or push content to the user. This goal can be achieved only by persuading the user to visit/bookmark his site, or by sending the user a message containing the bookmark, which is generally considered intrusive and annoying.

This invention offers a solution to the usability problem, and presents a greatly improved means for the user to find relevant remote content when he needs it, and for the owner of remote content to present relevant services in a manner that is convenient, attractive and non-intrusive.

According to a first aspect of the invention there is provided an method of providing content data to a mobile terminal, the method comprising the steps of the mobile terminal: (a) receiving content data transmitted by a content server; (b) classifying the content data in accordance with classification data; (c) storing the content data within the mobile terminal; (d) creating an access object whereby the content data may be accessed; and (e) associating the access object with further access objects having similar classification data, the method being characterised in that step (b) comprises classifying the content data in accordance with classification data comprised within the content data.

According to a second aspect of the invention there is provided a content installation module for a mobile terminal, the module, in use: classifying content data received by the mobile terminal in accordance with classification data; storing the content data within storage means within the mobile terminal; creating an access object to access the content data; the access object being associated with further access objects having similar classification data, the method being characterised in that classifying the content data comprises classifying the content data in accordance with classification data comprised within the content data.

Computer software programs for implementing the first and second aspects of the present invention may be provided on computer readable data carriers. The content data may be content for display by the terminal, such as text, audio, video, etc., or it may be an object that can be executed by the terminal, for example an application such as a Java applet or a MIDlet.

The invention will now be described, by way of example only, with reference to the following Figures in which.

Figure 1:
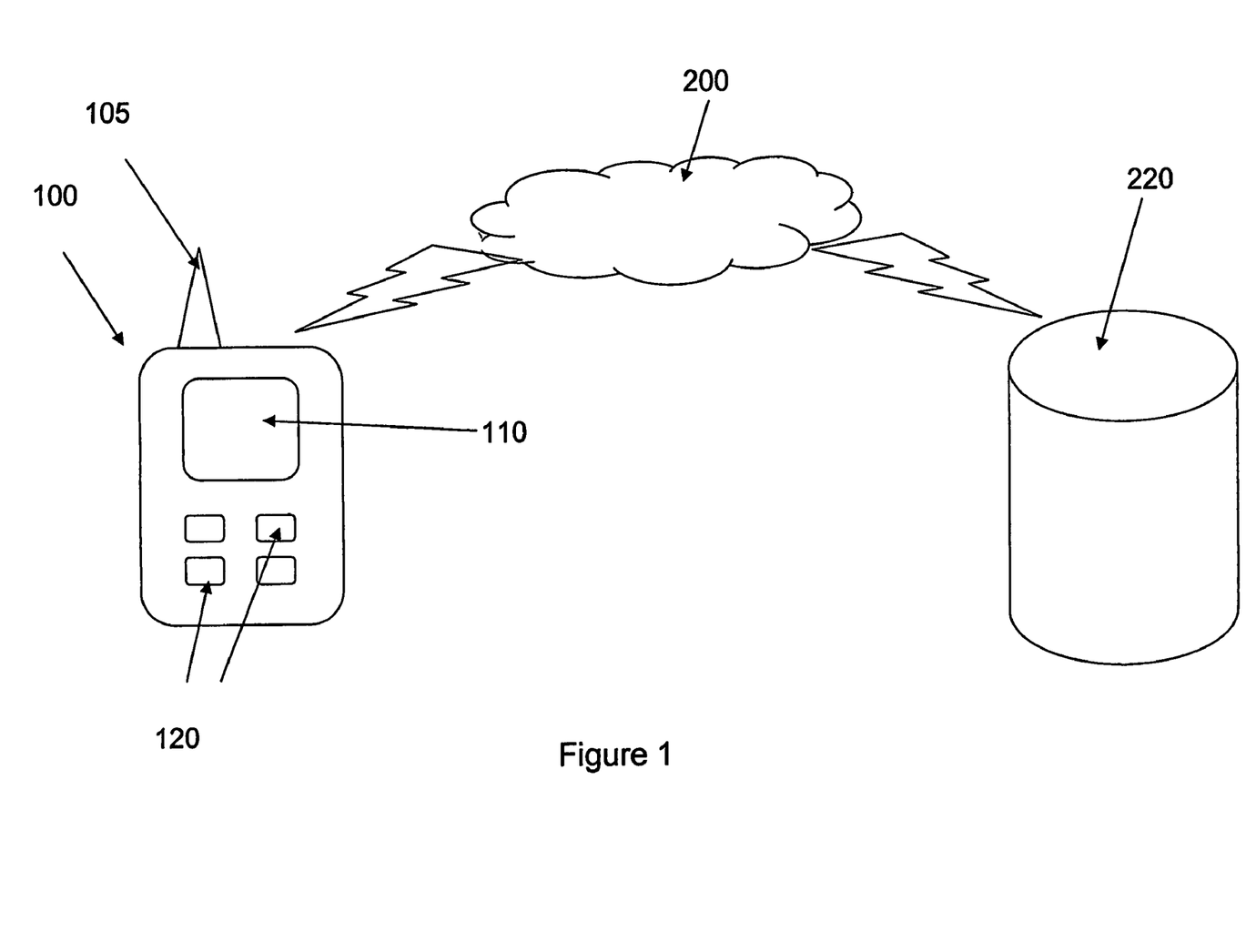
FIG. 1 is a schematic depiction of a mobile terminal according to the present invention.

FIG. 1 shows a mobile terminal 100 suitable for use with the present invention. The mobile terminal comprises a radio antenna 105, a display device 110 and a user input device 120. The display device 110 displays a number of items, such as a viewable text or an image, that comprise or are associated with a hyperlink. Selecting the hyperlink using the user input device causes the mobile terminal to display a further item or items associated with the hyperlink, for example a menu of options or a data file. The item (or items) associated with the may be stored locally within the mobile terminal or on a remote data store 210, which is connected to the mobile terminal by wireless communications network 200. Both local and remote items are presented together to the user on the display device, although an indication may be given to the user as to whether an item is stored locally or remotely. For example, the display device might show a menu having the options of 'News', 'Sport', 'Entertainment', 'Business', 'Games' and 'Horoscope'. Selecting the 'News' menu may bring up a list of several headlines which are stored locally and have been downloaded from a content provider's data store 220 that is connected to the mobile terminal by wireless communications network 200. Selection of one of these headlines will cause the mobile terminal to connect to the remote data store 220 to download the content (text, audio, video, etc) that is associated with the selected headline. A number of similar arrangements may be provided for the other menus, with some content being stored locally and some remotely. The menus may contain a number of submenus, for example the 'News' menu could link to a number of headlines and/or a number of submenus, for example 'National News', 'Local News', 'International News', 'Political News', etc. For example, if the user enters a birth date into a locally based application this can be supplied to a remote application that generates a horoscope for that birth date. The horoscope could be stored locally on the mobile terminal or a local hyperlink could reference the appropriate horoscope data stored on a remote data store.

The user interface (UI) for such a mobile terminal is conveniently created using a mark-up language (ML) that creates user screens locally using a UI engine 150 that can generate ML compliant data that is rendered by a browser 160 for display on the display device 110. Typical mark-up languages used with mobile terminals are HTML (Hyper Text Mark-up Language) or WML (Wireless Mark-up Language).

It will be clear from the above that it is necessary for the terminal to receive episodic updates of data content to be stored locally and hyperlinks, along with any associated content, to refer to remotely stored content. These updates need to be received over the wireless communications network 200 and then installed within the mobile terminal such that the content is correctly stored within a menu-based hierarchy so that it can be accessed by a user.

Figure 2:
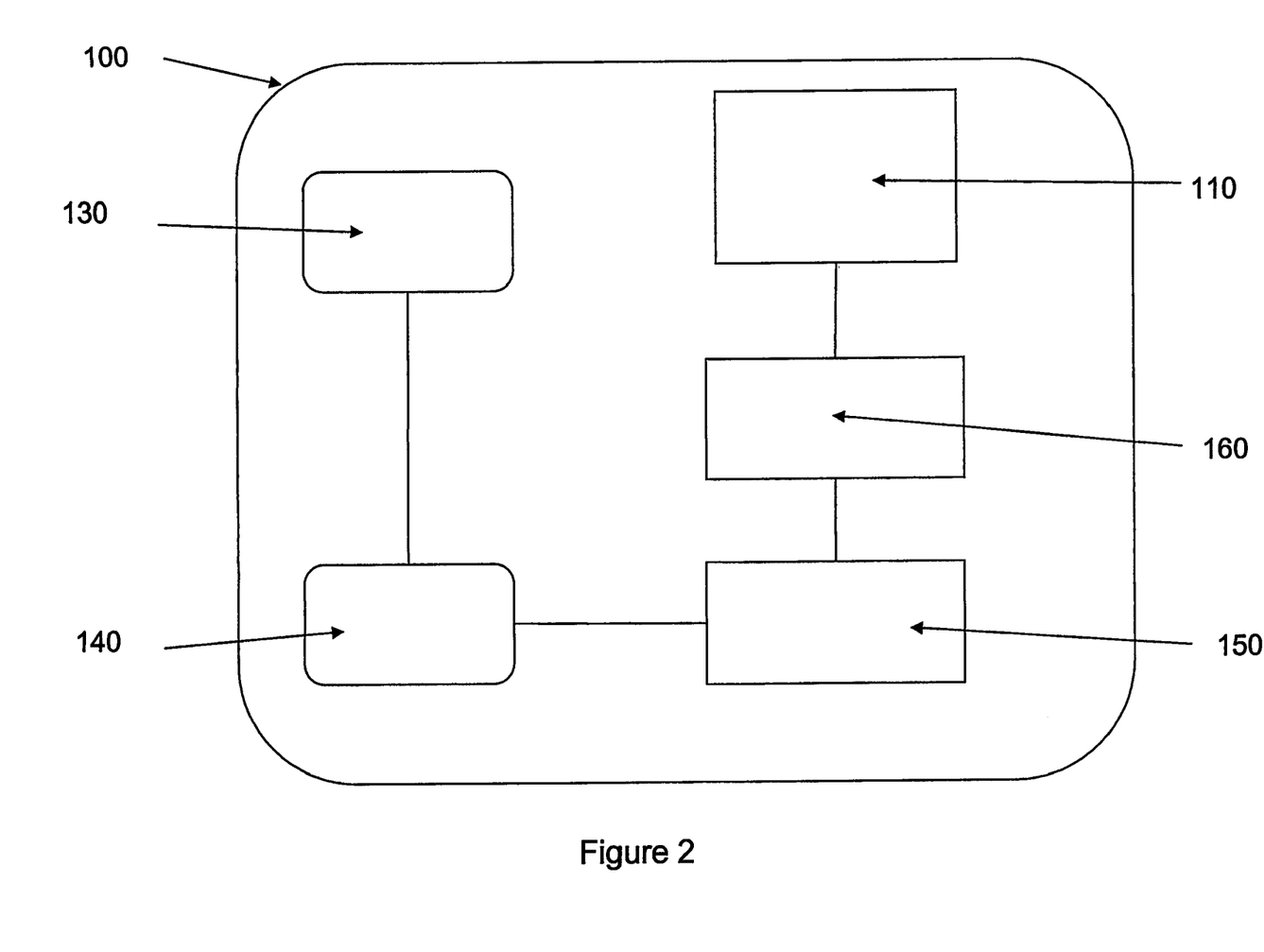
FIG. 2 is a schematic depiction of the process whereby content is provided to the mobile terminal.

FIG. 2 shows a schematic depiction of the process whereby content is transmitted to the mobile terminal. The content data is transmitted to the mobile terminal 100 over the wireless communications network 200. The incoming content data is processed by a validation module 130 to ensure that transmission has taken place correctly (for example, the use of error checking and/or error correcting codes) and that the content is suitable for use with the mobile terminal (for example that the terminal has sufficient storage capacity to store the content, that the content type [e.g. video, audio, text, etc] is suitable for the particular mobile terminal, etc.).

The content data is then processed by the installation module 140 and an entry is made in a log file to assist in the subsequent management and deletion of the content data. Preferably, the content data includes one or more of the following characteristics:

- A unique identifier to simplify the deletion, modification or overwriting of the content data.
- A version number corresponding to the minimum version of the installation module (140) for which this content data will operate successfully.
- A content category, to allow the installer to place the content in the most suitable location within the menu structure and within a page. Nested or hierarchical categories allow the content to be referenced from multiple menus and submenus.
- A start date & time, before which the content will not be available to the user.
- An expiry date & time, after which the content will no longer be available to the user.
- A tag to indicate whether the user has the right to delete the content.
- A tag to indicate whether the user has the right to share the content with other mobile terminals.
- A data payload, which can consist of viewable content (text or images), animated graphics, other multimedia content such as audio and video, telephone numbers and descriptors, email addresses and descriptors, logical elements to manage local behaviour, such as JavaScript components, links to new installed pages, links to remote content, means to install pages into the user interface tree, etc.
- A Digital Rights Management (DRM) scheme may be used to protect the data payload from unauthorised copying, sharing, or excessive use.

An example of such content data is given below in Appendix A using XML (extended Mark-up Language), which has the potential for providing far greater functionality than the more conventionally used HTML. Preferably the installation module is implemented using XML so that functionality upgrades might easily be applied.

The nature and type of content that is provided to a user terminal may be controlled directly by the terminal user, or the user may register a number of interests and preferences with one or more content providers. Local content will generally be provided free of charge whilst the user may be charged to access some remote content, which may then be stored locally once it has been paid for. Advertising may be used to subsidise the cost of content provision. Potential content and thus the nature of links to remotely stored content are virtually unlimited and may include, without restriction, news, sports, jokes, digital music (for example MP3 files) and music information, access to network operator and terminal manufacturer support services, games and on-line gaming, new, user billing and account details, directory services, m-commerce merchants, etc. The local content may be displayed so as to appear different to remote content i.e. through using different text fonts or colours, or through the insertion of an icon next to the links in question. This communicates to the user that there may be a cost or transmission delay before the content can be accessed.

FIG. 4 shows an example of how local content and remote content can be presented on a mobile terminal. FIG. 4*a* shows a number of links, some of which are to local content (i.e. calendar data) and some of which are to remote data (i.e. a taxi service and a dating service). FIG. 4*b* shows the result of 'focussing' on the dating service link (i.e. positioning a cursor or other selection device over the link without selecting it. Once the link is selected, remote content must be downloaded and FIG. 4*c* shows a page that is displayed whilst the remote content is being acquired. Preferably this page is stored locally, but if it is stored remotely then it should be designed to download in as little time as possible. FIG. 4*d* shows a page of remote content that has been delivered to the mobile terminal.

Figure 3:
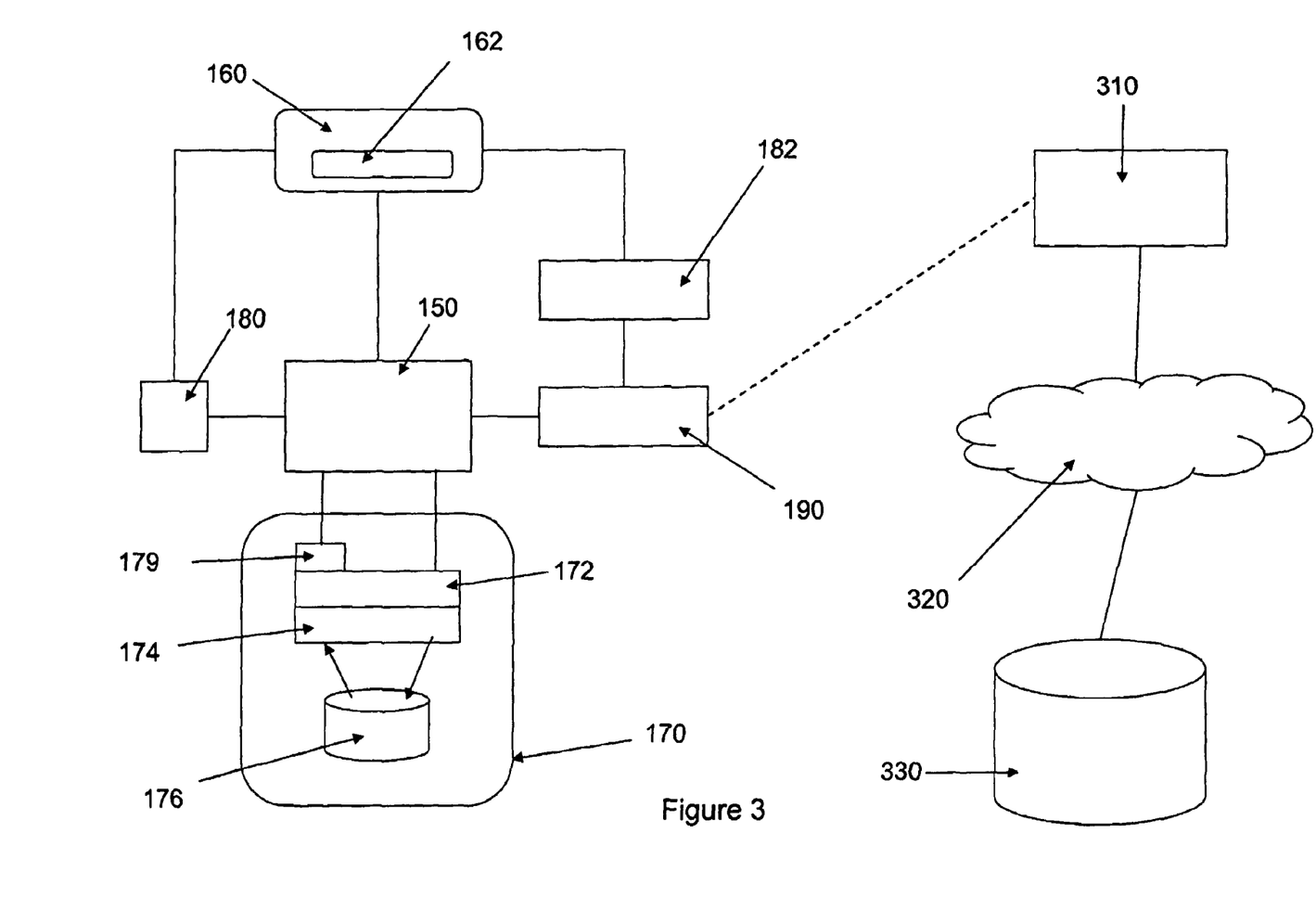
FIG. 3 is a schematic depiction of the processes whereby data content is displayed on the display device 110 of the mobile terminal 100.
Figure 4A:
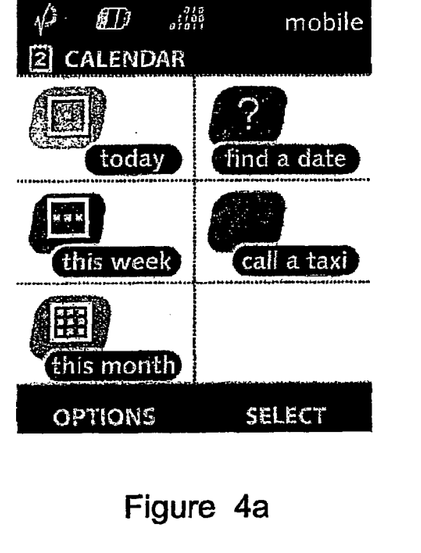
FIG. 4 is a schematic depiction of the representation of local and remote content on a mobile terminal.
Figure 4B:
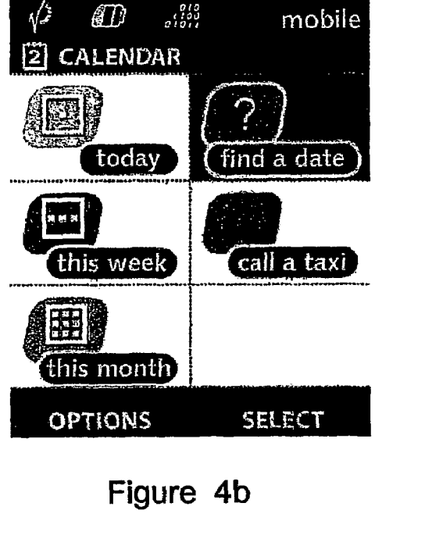
Figure 4C:
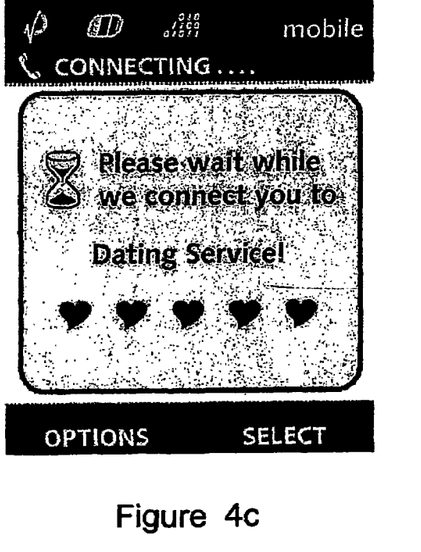
Figure 4D:
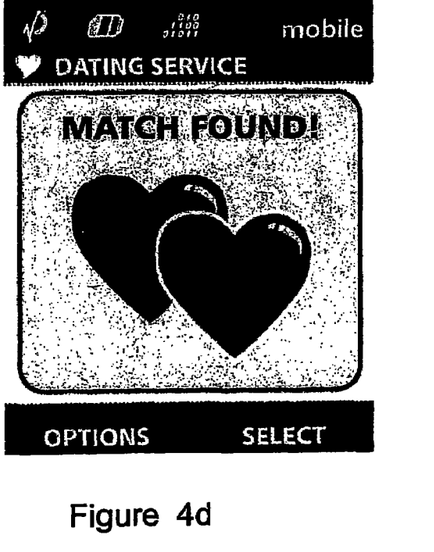

FIG. 3 shows a schematic depiction of the processes whereby data content is displayed on the display device 110 of the mobile terminal 100. The data content is displayed through the rendering of mark-up language compliant data by the browser 160. The browser may comprise Java Virtual Machine (JVM) 162 to enable Java applets to be executed by the terminal (or alternatively a discrete JVM may be provided). The user selects a hyperlinked data item using the user input device 120 and the UI engine interprets this selection and identifies whether the data item referred to by the hyperlink is stored locally (i.e. within the mobile terminal or an associated storage device) or remotely (i.e. on a content server which is connected to the terminal by a wireless communications network).

If the data item is stored locally then the UI engine 150 sends a request to the content database system 170, which comprises a database API 172, a database engine 174 and a database 176, the database being stored on a storage device 178. The UI engine request is interpreted by the database API 172 and the interpreted request is passed on to the database engine 174. The database engine then queries the database 176 using the interpreted request and the database returns the raw content data associated with the original UI engine request to the database engine, which forwards the data to the database API. The database API then places the raw content data within an XML wrapper and sends it to the UI engine. Depending upon the nature of the content data and any user preferences, the UI engine may send the content data directly to the browser 160, where the content is rendered and displayed to the user. Alternatively the UI engine may apply one or more XSL (extended style language) style sheets to format the content data (which may include encoding the data into another format that is more suitable for rendering by the browser, for example HTML or WML), before sending the data to the browser, where the formatted data is rendered and presented to the user in the desired format.

If the data item that is selected by the user choosing a hyperlink is stored remotely then the UI engine prompts the browser to send a request to the network location indicated by the selected hyperlink. The browser's request is sent via the protocol stack 182 that is required for successful communication over a wireless communications network. The protocol stack comprises the standard TCP/IP protocols which allow the mobile terminal to communicate with internet hosts and the transport and physical layer protocols, for example the third generation UMTS protocols, that enable the mobile terminal to access and communicate over a wireless communications network. The mobile terminal establishes a communications link between the radio interface 190 a network access server (NAS) 310 that routes the browser's request to the appropriate content server 330, via the internet 320.

The content server 320 will check that the mobile terminal that originated the request is allowed to access the requested content (e.g. a registered user of the server, sufficient credit in account to buy the content, etc.) The content is then transmitted across the internet to the NAS, where it is then transmitted across a wireless communications link to the mobile terminal where it is received at the radio interface. The data content packets will then pass through the protocol stack from which the content can be extracted and the content passed to the browser. Dependent upon the nature and format of the content, the browser may be able to render it (either directly or using additional functionality provided by 'plug-in' modules) for display on the display device or the content data may be forwarded to the UI engine in order to have an XSL style sheet applied in order to transform the content data into a format that can be rendered by the browser. It will be understood that the XML and XSL processing of data may be centralised, for example in the UI engine, the browser, or in a separate XML processing module 180, or distributed within more than one of the entities discussed above, with some processing being performed when data is sent by and/or received at the entity.

If the content is a MIDlet (Mobile Information Device Application) ID then the JVM will instantiate the MIDlet (or install and instantiate the MIDlet if it is remotely located) without applying style sheets to the MIDlet.

As is described above, the remote content will have a content tag, which may conveniently be incorporated into the page description as HTML tags, for example <category 1>Sport</category 1>. In this case the installation module 140 will look for a Sport menu (or submenu) from which the content can be accessed. In addition the content might be accessed from additional menus for the most recently downloaded or most recently accessed content. If the tag is, for example, Football then the installation module may recognise that Football is a subset of Sport and store the content under the Sport menu if there is no Football submenu.

If there is no dedicated Sport menu then a link to the content may be added to a General or Miscellaneous menu so that the user may access the content. Alternatively the installation module may prompt the user to generate a Sport menu and then store the link for the new content within that menu. In a further alternative the remote content may be displayed in a random sequence.

Furthermore, tags may be inserted within the content, such as <category 2>Advert</category 2> located at a point considered by the content layout designer as being suitable for the insertion of an advert.

Some content may include multiple tags, for example 'Sport and Advertising'. On receipt of this content the installation module will attempt to insert the content into a Sport menu at the first point where a vacant Advertising tag exists. If no such Advertising tag is found, the installer may attempt to insert it at the bottom of the Sport page. If multiple Sport menus and submenus are found, the installer will place the content within the highest level of the menu hierarchy. New content can be installed within menus that have been created by previous installations and if the content is an update or a development of previously downloaded content then new content may be inserted into or used to overwrite the previously downloaded content.

Installed remote content may be deleted by the user (unless the permission tag indicate he may not), by the expiration of the expiry time and date, or remotely by a command sent over the network using the content's unique identifier. Pages cannot be deleted or expired if they in turn have had newer content installed onto them, which has not yet been deleted or expired. Advantageously the user may have visibility of all content that has been installed onto his handset, for example by chronological order, as well as ability to remove some or all of the installed content simultaneously.

Content can be installed in one of two methods. The installation module may insert the received content into the pages already in the database, following a cut and paste model, whilst maintaining a log of insertions (the content and the recipient pages) to allow it to remove the content later.

Alternatively, the received content may be placed in a separate library, and a link to the content be inserted into the target page. In this latter case, the UI engine must dynamically follow the link in order to build the full page. An advantage of using this method is that page content can be varied, according to user preference, and is more able to present remote content in an optimally located way. For example, if a sports advert is received but no sports page exists yet, the installer will default to putting it in some general or miscellaneous page. However, if a sports page is received and installed some time later, the installer may then move the link for the sports advert to the more appropriate location.

As an alternative to putting received content into locations determined by tags placed in the page description HTML, in another embodiment content data may be placed in fixed slots which are pre-determined at the time of the terminal's configuration. An example of such a location would be a fixed slice of screen area, above the soft keys area and below the main applications pane. This area can be identified by associating it with a tag type for example <category 1>ScreenSpace</category 1>. It will be understood that such a slot could be of any shape (including non-rectangular), and could be in any screen position. The nature of the slot (shape, size, transparency attributes) can be itself be controlled and changed by use of a suitable command channel. It will be understood that the arrangement can be extended to encompass multiple slots. Received content bearing such a tag type would always be located in that slot. Multiple items of received content that match that tag type might be displayed sequentially or randomly. Alternatively, the area visibly behind the main application pane can also be designated as a fixed slot. This location allows material to be displayed faintly but constantly in the central background of any or all pages, in the manner of a faint watermark on a piece of paper.

Some UI technologies make it possible for the user or operator change the theme of a handset UI (sometimes referred to as the UI skin). This can be achieved either by selection from a pre-installed set of skins that are pre-installed within the handset, by downloading new skins to be installed into the handset from local or remote networks, or via a plug-in device such as a smart skin (see, for example, our co-pending application GB0128654.1 or the Smart Skin product manufactured by Wildseed Ltd.). The installation module may be compatible with such a system, and can take priority over it in the UI hierarchy by forcing persistence.

Thus, downloaded material that has been installed should remain present and visible after a change of skin, although the appearance of the material may have been changed by the application of the new skin. Optionally, downloaded material may include an additional characteristic tag to indicate whether the item will remain present and visible after the application of a new skin, or whether the new skin will cause the content to not be displayed.

Downloaded theme changes may also include sound events as a part or the whole of their content. Sound events that are subject to updating can include without restriction ring tones (as are already in wide use), message alerts, battery state indications, key press tones, game tones, cover opening/closing tones, start-up/shut-down tones, signal level and radio coverage alerts, time alarms, calendar events, error conditions, or any combination of the above, such as a special tone to indicate start-up whilst conditioned by a message outstanding in an inbox. These may used in isolation or can be linked to a graphic display event.

If a user selects content to be downloaded then it should be transmitted in response to the user's request, unless the user requests transmission to be deferred. However, if a content or network provider is 'pushing' content to the mobile terminal then it is preferable if this to occur in the background without inconveniencing the user, for example at night time or in accordance with typical usage patterns. This content pushing may be suspended if the user makes use of the mobile terminal.

Distribution of installed content may be unique to a specific handset (uniquely addressed), or the same content may be multicast or broadcast to many handsets, using known transmission techniques. Installed content may be conveniently carried within a multimedia message, such as the Multimedia Message System (MMS) with the remote content being carried in the MMS and using a unique MIME (Multipurpose Internet Mail Extensions) type, such as x-vnd.3glab-triglet. EMS (Extended Messaging System) and WAP pushing are also suitable distribution mechanisms.

The mobile terminal may not always be within network radio coverage (being out of service area, in a tunnel, etc). By including a certain amount of viewable local content, the user is protected to some extent from being out of coverage. For example, he can still read the news headlines, even if he cannot follow the link to access further details. In such a situation links that are inaccessible because, for example, the handset is out of network radio coverage are clearly indicated to the user in a visible fashion, for example include rendering the links in a different colour font or making it impossible to select the link.

This change can be performed by the UI engine, which receives an input signal from the radio subsection, indicating the status of the wireless data link, and uses this signal to modify the visible attributes of links before delivering the content to the local browser. This modification could be achieved by changing the stored database, for example to change the link text colour to grey of all remote links within all pages, or alternatively, the text colour of remote links can be modified 'on the fly' prior to rendering. In either case, it is necessary to distinguish local content from remote content. This may be achieved by checking for http:// in the link (which is a pre-requisite for pointing to a non-local resource), having all local links use the Internet Protocol address 127.0.0.1 (which by convention is used to identify local host) or by arranging that local links omit the hostname, e.g. /localdirectory/page.html.

In addition to content such as text, audio or video, the present invention can be used to install Java-based application programs into a mobile terminal. The Java 2 Micro Edition (J2ME) provides a platform through which a Java Virtual Machine (VM) can be created within a mobile terminal, despite the terminal having significantly reduced capabilities when compared with a personal computer. Java compliant applications, commonly referred to as applets, can be executed within the VM enabling an applet to function across a number of different platforms (as long as the platform is capable of supporting a VM). Applets that are properly constructed using J2ME are compatible with the other Java variants and thus such an applet can be executed by any terminal, from a mobile telephone to a desktop personal computer. In order to assist the compatibility of applets when executed across a range of mobile terminals, such as cellular telephones, that may have significantly different capabilities, such as processor speed, memory, display size, etc. a Mobile Information Device Profile (MIDP) has been specified. Applets that comply with MIDP are commonly referred to as MIDlets.

Users of mobile terminals are likely to have a need to dynamically install and uninstall MIDlets, whilst handset manufacturers and network operators will wish to supply handsets that have pre-installed MIDlets. Furthermore, service and content providers will wish to 'push' MIDlets to mobile terminals in the hope that users will then pay for access to further MIDlets or other forms of content.

MIDlets can be instantiated by, for example, a user selecting a highlighted icon or text segment using the keypad of the mobile terminal. The MIDlet will then be executed within the Java VM, responding appropriately to any user input or data received from an external source, for example a database stored within the terminal or on a remote server.

Within a development environment a MIDlet can be instantiated by entering the name of the MIDlet at the command line. Clearly this is not suitable for a mobile terminal, which may have a restricted keypad, so a more suitable mechanism for instantiating the MIDlet must be provided, for example a hyperlinked icon or text label. This allows the a hyperlink for a MIDlet to be inserted anywhere within a UI, as discussed above. MIDlets can be provided with an identification (ID) tag that can be used as the basis for the identifying hyperlink.

MIDlets may be installed locally within the terminal or the terminal may store the ID for a remotely located MIDlet. If the ID for a remotely located MIDlet is selected then the terminal will download the MIDlet, install and run the MIDlet (if the user does not have sufficient access rights then the MIDlet may uninstall or delete itself once its execution has been completed).

The use of the methods outlined above in the context of installing content can be used to install MIDlets, providing a number of distinct advantages for the user. For example, the user can access their favourite MIDlets directly from convenient points in the UI, allowing the user to link contents with associated MIDlets, rather than having to navigate to a special MIDlet page or service. Also, it is more convenient for the user to have a MIDlet provided by the installation of an ID item, compared with having to navigate to a MIDlet portal, manage the download process and then run the MIDlet as a separate program. This in turn makes it easier for developers or operators to promote new MIDlet-based applications or services as it is only necessary to install suitable MIDlet IDs within user UIs rather than having to install the MIDlet itself.

Further similarities may include that if network coverage is not available to a mobile terminal, then the ID hyperlink can be 'greyed out' to indicate that the MIDlet is unavailable. The MIDlet may have a 'Category' tag that defines the most relevant place that MIDlet may be stored within the UI, or the UI may be placed in a pre-determined fixed slot. The MIDlets (or their IDs) may comprise tags that enable (or forbid) the user to delete and/or share the MIDlet, and a MIDlet ID can be installed onto pages that themselves have been installed previously by the downloading of remote content (see above).

Whilst it is possible to install (and then uninstall) a MIDlet ID for a MIDlet that is remotely located without having to having to install the MIDlet itself, a MIDlet ID for a locally stored MIDlet must be installed and uninstalled in track with the corresponding MIDlet.

In contrast to the methods described above, where the remote content can take many forms, the downloaded data will be Java code content, typically in the Java Archive (JAR) format. The invention can also be used to install MIDlet suites, which comprise a plurality of MIDlets into the UI of a mobile terminal.

It will be understood that the present invention is suitable for application with all manner of mobile terminals, and not just with simple mobile telephones. Even before mobile use of the internet and remotely stored data has become ubiquitous it is possible to purchase personal digital assistants (PDAs) that have mobile communications capabilities (for example the RIM BlackBerry, Nokia 9210 Communicator, Palm i705 etc.) or mobile phones with functionality not previously found in such devices (for example the Nokia 5510 & 7650 or the Ericsson T65). In the future it is likely that mobile devices will continue to be developed and for their functionality to widen, with less of a distinction between PDAs and mobile telephones. It should be appreciated that the present invention is applicable to all of these sorts of devices and also to laptop and portable computers that have a modem enabling mobile communications.

The present invention may be implemented over virtually any wireless communications network, for example second generation digital mobile telephone networks (i.e. GSM, D-AMPS), so-called 2.5G networks (i.e. GPRS, HSCSD, EDGE) and third generation UMTS networks. Within buildings and campuses other technologies such as Bluetooth or wireless LANs (whether based on radio or optical systems) may be used.

Computer software for implementing the methods described above, the UI engine and/or the installation module may be provided on data carriers such as floppy disks, CD-ROMS, non-volatile memory cards, etc.

APPENDIX A

```
<?xml version="1.0" ?>
<triglet>
<ID>1234-83745-5554-qjy</ID>
<category>
    Sports
    <class>
        Advert
    </class>
</category>
<start>2002-01-13 06:30:00 +0000</start>
<expire>2002-01-17 17:30:00 +0000</expire>
<rights>
    <no_delete/>
    <no_share/>
</rights>
<html>
<body>
<li><a
    href="http://www.tickets4sale2u.com/special/wim/">Click
```

APPENDIX A-continued

```
    for great Wimbledon ticket offer!</a></li>
</body>
</html>
</triglet>
```

The invention claimed is:

1. A method of providing content data to a mobile terminal, the method comprising:
    (a) receiving content data transmitted by a content server;
        (b) classifying the content data in accordance with classification data;
        (c) storing the content data within the mobile terminal;
        (d) creating an access object whereby the content data may be accessed; and
        (e) associating the access object with a second access object having similar classification data and being operable to be transmitted by the content server only when the second access object is selected on the mobile terminal;
    wherein (b) comprises classifying the content data in accordance with classification data comprised within the content data.

2. The method according to claim 1, wherein the access object created in step (d) comprises content data.

3. The method according to claim 1, wherein the access object created in step (d) comprises a local control command.

4. The method according to claim 1, wherein step (e) comprises creating a hierarchical tree to store the one or more access objects in.

5. The method according to claim 4, wherein step (e) further comprises extending the hierarchical tree when content data comprising a new classification code is received.

6. The method according to claim 1, wherein the access object is displayed on a display screen associated with the mobile terminal.

7. The method according to claim 6, wherein the access object is displayed within a pre-determined section of the display screen.

8. The method according to claim 6, wherein the access object comprises a first time value such that the access object is not displayed until the first time value is attained.

9. The method according to claim 6, wherein the access object comprises a second time value such that the access object is displayed until the second time value is attained.

10. The method according to claim 6, wherein one or more access objects are displayed on the display screen and each of the one or more access objects is associated with either:
    (i) a local control command;
    (ii) a content data stored within the mobile terminal; or
    (iii) content data stored remotely from the mobile terminal.

11. The method according to claim 10, wherein the appearance of access objects associated with remotely stored content data is altered to indicate whether the mobile terminal is in connection with the device storing the remotely stored content data.

12. The method according to claim 10, wherein the access object comprises data indicating whether the associated content data may be made available to other terminals.

13. The method according to claim 6, wherein the display of one or more access objects causes the terminal to display a user interface page.

14. The method according to claim 13, wherein the user interface page is updated by inserting one or more further access objects.

15. The method according to claim 13, wherein the user interface page is updated by deleting one or more access objects.

16. The method according to claim 1, wherein the access object created in step (d) comprises a hyperlink.

17. The method according to claim 16, wherein the created access object comprises a hyperlink associated with content data.

18. The method according to claim 17, wherein the content data is audio data.

19. The method according to claim 16, wherein the created access object comprises a hyperlink associated with an executable object.

20. The method according to claim 19, wherein the executable object complies with a Mobile Information Device Profile (MIDP).

21. A content installation module for a mobile terminal, the module, comprising:
   classifying content data received from a content server by the mobile terminal in accordance with classification data;
   storing the content data within storage means within the mobile terminal;
   creating an access object to access the content data;
   the access object being associated with a second access object having similar classification data and being operable to be transmitted by the content server only when the second access object is selected on the mobile terminal,
   wherein classifying the content data comprises classifying the content data in accordance with classification data comprised within the content data.

22. The content installation module according to claim 21, wherein the module stores one or more access objects in a hierarchical tree.

23. The content installation module according to claim 22, wherein the module extends the hierarchical tree when content data comprising a new classification code is received.

24. The content installation module according to claim 21, wherein the module further displays the access object on a display screen associated with the mobile terminal.

25. The content installation module according to claim 24, wherein the module displays the access object within a pre-determined section of the display screen.

26. The content installation module according to claim 24, wherein the module displays one or more access objects display screen and each of the one or more access objects is associated with either:
   (i) a local control command;
   (ii) content data stored within the mobile terminal; or
   (iii) content data stored remotely from the mobile terminal.

27. The content installation module according to claim 26, wherein the module alters the appearance of access objects associated with remotely stored content data to indicate whether the mobile terminal is in connection with the device storing the remotely stored content data.

28. A computer-readable medium encoded with computer executable instructions comprising:
   (a) at least one instruction for causing a computer to receive content data transmitted by a content server;
   (b) at least one instruction for causing a computer to classify the content data in accordance with classification data;
   (c) at least one instruction for causing a computer to store the content data within the mobile terminal;
   (d) at least one instruction for causing a computer to create an access object whereby the content data may be accessed; and
   (e) at least one instruction for causing a computer to associate the access object with a second access object having similar classification data and being operable to be transmitted by the content server only when the second access object is selected on the mobile terminal;
   wherein (b) comprises at least one instruction for causing a computer to classify the content data in accordance with classification data comprised within the content data.

29. A mobile terminal comprising:
   means for classifying content data received from a content server by the mobile terminal in accordance with classification data;
   means for storing the content data within storage means within the mobile terminal;
   means for creating an access object to access the content data;
   means for associating the access object with a second access object having similar classification data and being operable to be transmitted by the content server only when the second access object is selected on the mobile terminal,
   wherein classifying the content data comprises means for classifying the content data in accordance with classification data comprised within the content data.

* * * * *